May 2, 1967  W. PIEPENBRINK ETAL  3,317,738
PHOTOELECTRIC SCANNING ARRANGEMENT USING LIGHT
CONDUCTING ROD WITH FLUORESCENT PORTION
Filed Dec. 11, 1964  2 Sheets-Sheet 1
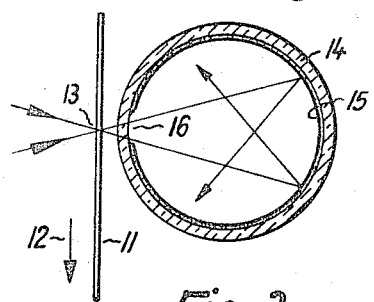
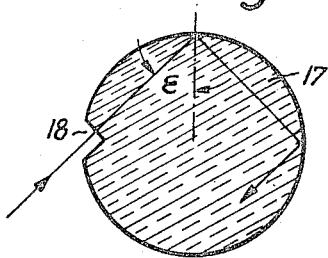
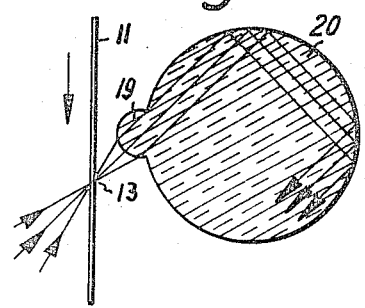
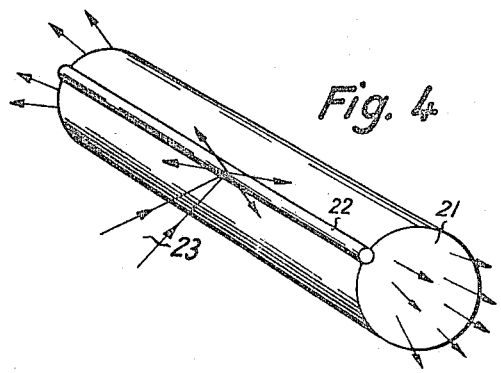
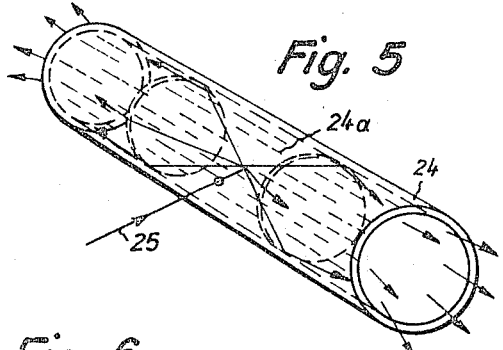
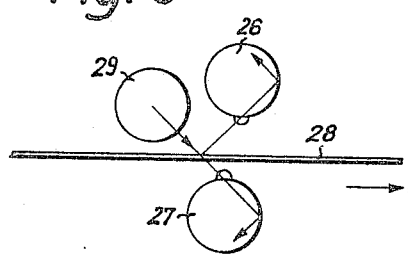
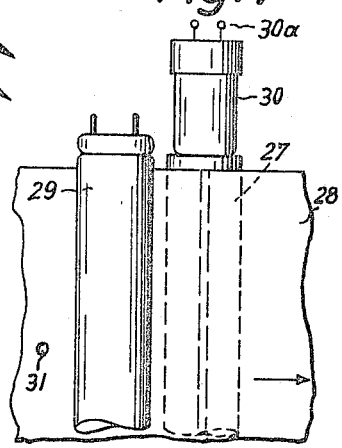
Inventors:
Winfried Piepenbrink
Erwin Sick
By: Spencer & Kaye
Attorneys May 2, 1967   W. PIEPENBRINK ETAL   3,317,738
PHOTOELECTRIC SCANNING ARRANGEMENT USING LIGHT
CONDUCTING ROD WITH FLUORESCENT PORTION
Filed Dec. 11, 1964
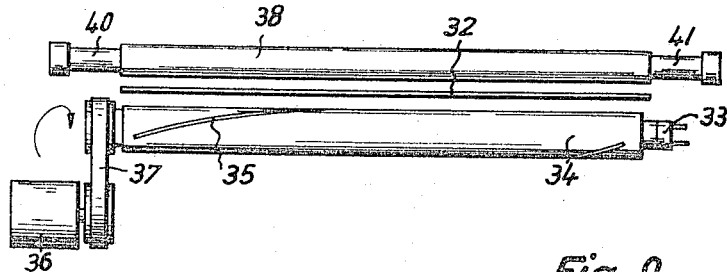
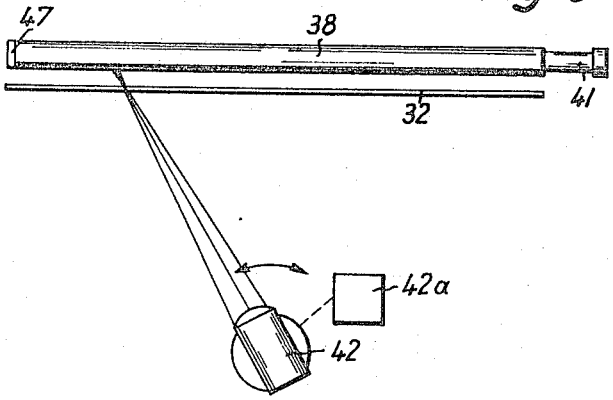
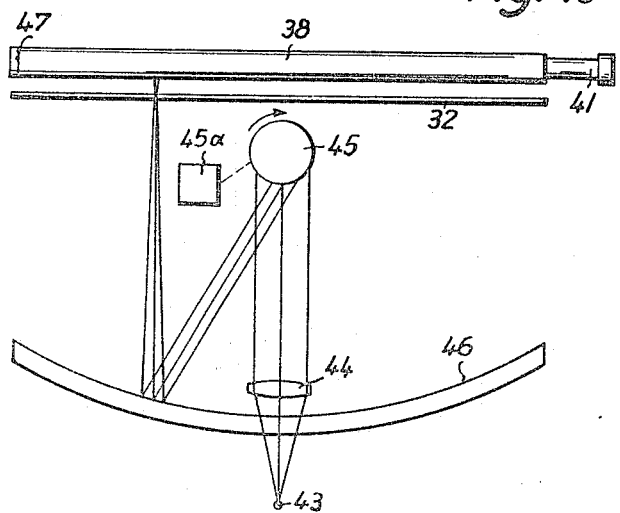
Inventors:
Winfried Piepenbrink
Erwin Sick United States Patent Office 3,317,738
Patented May 2, 1967

3,317,738
PHOTOELECTRIC SCANNING ARRANGEMENT USING LIGHT CONDUCTING ROD WITH FLUORESCENT PORTION
Winfried Piepenbrink, Munich, and Erwin Sick, Icking, Isartal, Germany, assignors to Licentia Patent-Verwaltungs-G.m.b.H., Frankfurt am Main, Germany
Filed Dec. 11, 1964, Ser. No. 417,593
Claims priority, application Germany, Dec. 12, 1963, S 88,681
13 Claims. (Cl. 250—227)

The present invention relates to a scanning arrangement.

More particularly, the present invention relates to an arrangement by means of which material on, and especially material moving along, a work path can be optically scanned in order to inspect it for certain characteristics, such as holes, perforations or texture flaws. The arrangement may be used, for example, for examining material in sheet form, such as paper, metal, leather, and so on.

Material of the above type can be illuminated by a suitable light source and the light emanating from the material can then be scanned by light pick-up means. If the light source and the light pick-up means are located on the same side of the material, the light picked up will be reflected light, whereas if the light source and the pick-up means are located on opposite sides of the work path, the light picked up will be such light as is passed through the material, as a result, for example, of holes. If desired, separate pick-ups may be provided for picking up both reflected light and light passing through the material. In case of material with an irregular surface, e.g., leather, the arrangement can be used for testing the texture or consistency of the material.

There exist various types of scanning devices in which the light pick-up means are constituted by one or more photocells which respond to the light coming from the material. Such a pick-up arrangement has been found to be exceedingly sensitive to ambient light. In the case of relatively wide work paths, the light intensity varies throughout the sweep of the light spot over the width of the work path, if the scanning arrangement includes such a sweeping light spot type light source. Therefore, a number of photocells or the like have to be arranged over the entire work path in order that the total light picked up during the sweep remains substantially constant. Nonetheless, experience has shown that even those arrangements have a relative high noise level, so that existing scanning devices have, in practice, been found to be not sufficiently sensitive to pick out small faults of the type which the arrangement is supposed to respond to.

Various attempts have been made to overcome the above drawbacks by using in the scanning arrangement illuminating devices by which the material is illuminated evenly, there being movable optical elements which allow a photosensitive receiver to scan the work path, for example line-by-line. However, relatively little light is reflected into the solid angle seen by the receiver, so that a very intense light source is needed. This, in turn, has resulted in the use of so-called autocollimated illumination which produces a light spot that periodically sweeps across the material, the light spot being picked up by the photosensitive receiver via the same optical means. The drawback of such an arrangement is that it can be used only when circumstances allow reflected light to be picked up, but not when—for example when a given material is to be inspected for determining the presence of holes—the light source and the light pick-up are arranged on opposite sides. Furthermore, if relatively wide work paths are involved, the optical means which allow the system to operate are very complicated and expensive. Further difficulties arise if the incident light is to be observed from another direction in order, for instance, to be able to check for the presence of faults, such as folds.

Other prior art arrangements involve the use of a plurality of individual photosensitive receivers which are distributed over the width of the work path. Not only is such an arrangement expensive, but it affords no way in which the width can be inspected continuously.

It is, therefore, the primary object of the present invention to provide an arrangement which overcomes the above drawbacks, namely to provide an arrangement which is of simple construction, which can pick up light over a relatively large solid angle, and which is suitable for picking up either reflected light or light that passes through the material being inspected, or both.

With the above objects in view, the present invention resides, basically, in an arrangement for scanning a material on a work path, which arrangement comprises a light source for projecting light toward the material, and means for picking up the light coming from the material, be it reflected light or light passed through the material, which pick-up means comprise an elongated light-conductive element, such as a rod, extending across the width of the work path, and photosensitive receiver means located at at least one end of the element for producing a signal in response to light which is picked up by the element and conducted toward the receiver means.

Additional objects and advantages of the present invention will become apparent upon consideration of the following description when taken in conjunction with the accompanying drawings in which:

FIGURE 1 is a sectional view showing a light-conductive element in accordance with the present invention.

FIGURE 2 is a sectional view showing another light-conductive element in accordance with the present invention.

FIGURE 3 is a sectional view showing yet another light-conductive element in accordance with the present invention.

FIGURE 4 is a perspective view of a still further light-conductive element in accordance with the present invention.

FIGURE 5 is a perspective view of another light-conductive element in accordance with the present invention.

FIGURE 6 is a side elevational view of an arrangement in accordance with the present invention in which there are light pick-ups on both sides of a material moving along a work path.

FIGURE 7 is a plan view of the arrangement shown in FIGURE 6.

FIGURE 8 is a sectional view showing one embodiment of a light source which produces a sweeping light spot that moves over the entire width of the material.

FIGURE 9 is a sectional view of another embodiment of a light source for producing a sweeping light spot.

FIGURE 10 is a sectional view of still another embodiment of a light source for producing a sweeping light spot.

The light-conductive element according to FIGURE 1 may consist for example of an inner reflecting glass tube, with the following dimensions: length: 2 meters, cross section: 30 mm. The light inlet slot has for example a cross section of 3 mm.

The light-conductive elements according to FIGURES 2–5 may consist for example of Plexiglas, with the dimensions: length: 2 meters and cross sections: 30 mm.

The photo-sensitive units at the ends of light-conductive elements may be for example front cathode-multipliers with a maximum sensitivity at 5461 angstroms.

Referring now to the drawings and first to FIGURE 1 thereof in particular, the same shows a piece of material 11 which moves along a work path in the direction of the arrow 12 and which is to be examined for determining, for example, the presence of holes. The material is illuminated along a line 13 extending at right angles to the direction of travel 12 such that line 13 is illuminated at all times although means, such as will be described below in conjunction with FIGURES 8 through 10, may be provided which move a light spot periodically across the work path and along the length of line 13. In practice, the manner in which the line 13 is illuminated will depend on the particular examination to which the material is to be subjected and on the prevailing optical conditions. The light which penetrates the work path impinges upon a light-conductive rod in the form of a glass tube 14, this being a tube which extends parallel to the line 13 being scanned and illuminated and which is provided with an interior reflective coating 15, the latter being interrupted only by a longitudinal extending, elongated light inlet slot 16.

Such light as passes through the work path at points where the material being tested is perforated will pass through the slot 16 and, due to the reflective coating 15, will ultimately be reflected toward the ends of the tube, whereat the tube is provided with suitable light-sensitive receivers which pick up the lgiht and put out an appropriate signal.

FIGURE 2 shows a light-conductive rod which makes use of the total reflection. Here, the light conductive rod 17 is a massive, i.e., not hollow, rod having a basic cylindrical configuration and made of a material having an index of refraction. The rod 17 is provided with a longitudinal groove 18 which itself has a triangular cross section. It is thanks to this groove that the light coming from the material being scanned enters the light rod such that when the light strikes the boundary surface, it is reflected totally at an angle ε. More particularly, the groove serves as a light entry portion such that light coming from the work path strikes the surface of the rod at right angles. It will be noted that, while the basic configuration of the rod is circular, its over-all cross-sectional configuration is non-circular, due to the presence of the light entry portion.

In the embodiment of FIGURE 3, the light entry portion of the rod 20 instead of being constituted by a groove, is in the form of a longitudinal bead 19 of circular cross section. The beaded light-conductive rod 19, 20, is so arranged with respect to the path 11 to be scanned that the beams of light emanating from the scanning line 13 are collimated, i.e., made parallel, and are directed against the boundary surface of the rod 20 to strike the same at such an agle that all of the light will be reflected.

FIGURE 4 shows a solid light rod 21 which is in part made of fluorescent material, the main body of the rod 21 is made of a clear, non-fluorescent material and is provided with a groove of semi-circular cross section within which is received a cylindrical rod 22 which itself is made of fluorescent material. When a point of the rod 22 is struck by a bundle of light beams 23, the material will, due to its fluorescence and at such point, emit light in all directions, as shown. The greatest part of this fluorescent radiation is passed on, by total reflection effected by the rod 21, to photoelectric receivers located at the ends of the light-conductive rod.

FIGURE 5 shows a light-conductive rod in the form of a glass tube 24 which is filled with a transparent fluorescent liquid 24a. A light beam 25 striking the liquid-filled tube 24 will cause the liquid to fluoresce, and the thus produced light, which is totally reflected toward the end surfaces of the rod, will be picked up by the light-sensitive receivers.

FIGURES 6 and 7 show a scanning arrangement incorporating two light-conductive rods 26, 27, each of the type described above in connection with FIGURE 3, the two rods 26, 27, being arranged on opposite sides of the path along which moves the material 28 to be inspected. The arrangement includes an illuminating lamp which is constituted by an elongated light source such as a fluorescent lamp 29, the same extending parallel to the line being scanned and over the entire width of the material as do the light-conductive rods 26, 27, so that the light-conductive rod 26 picks up such light as is reflected by the upper surface of the material (as viewed in FIGURE 6) and the light-conductive rod 27 picks up such light as may pass through the material being inspected. Each of the light-conductive rods has a photo-sensitive receiver arranged at the end, of which a receiver 30 associated with rod 27 is shown in FIGURE 7. This receiver will thus put out a pulse or other signal, appearing at output 30a, when a hole 31 (see FIGURE 7) passes between the light source 29 and the light-conductive rod 27.

FIGURE 8 shows a scanning arrangement in which the material being inspected is illuminated in such a manner that a light spot is moved periodically along the length of the scanning line which itself extends transversely to the direction in which the material 32 is moved. Accordingly, the arrangement comprises a light source, such as an elongated luminescent or fluorescent lamp 33 which extends transversely over the entire width of the material being inspected. This lamp is surrounded by a rotatably mounted drum 34 which is provided with a helical slot 35. The drum 34, which is coextensive with and surrounds the lamp 33, is rotated by means of a motor 36 which is connected to the drum via a belt drive 37, so that as the drum 34 rotates, a light spot moves periodically across the width of the material 32. Any light passing through the material 32 is picked up by the light-conductive rod 38 located on the opposite side of the material, and the light is then reflected, in the manner described above, to two photoelectric receivers 40 and 41 arranged at the ends of the rod 38.

FIGURE 9 shows an arrangement in which the periodic sweep of the light spot is produced by a light 42 which is mounted for pivotal movement about an axis transverse to the width of the work path, i.e., an axis which is at right angles to the plane of the drawing. The light 42 is periodically oscillated to and fro by means of a drive 42a so that a light spot produced by the light 42 is caused to sweep across the entire width of the work path occupied by the material 32. FIGURE 9 also shows one of the light-sensitive receivers, namely, the left-hand receiver as viewed in FIGURE 9, as being replaced by a mirror 47, so that such light as would otherwise be picked up at the left end of the light-conductive rod 38 is reflected toward the single photoelectric receiver 41 at the right.

FIGURE 10 shows an arrangement in which the periodic sweep of the light spot is produced by means of a light source 43 which puts out a beam that is focussed, by means of a lens 44, to produce a collimated beam directed onto a rotating drum-type polygonal mirror 45 driven by a motor 45a, which mirror reflects the light into a concave mirror 46 which, in turn, reflects the light onto the material being inspected. The mirror 46, which is generally parabolic, insures that the light spot is sharply focussed onto the material 32 throughout the span of the sweep over the width of the material.

It will be seen from the above that, in accordance with the present invention, there is provided an arrangement for scanning a material on a work path, this arrangement comprising a light source for projecting a light toward the material, and means for picking up the light coming from the material, the pick-up means comprising an elongated light-conductive element extending across the width of the work path and photosensitive receiver means located at at least one end of the element for producing a signal in response to the light which is picked up by the element and conducted toward the receiver means.

In practice, the pick-up means can be located very near the plane of the material, either above, below or even alongside and can pick up a relatively large solid angle. The light energy impinging upon the light pick-up bears virtually no relationship to where along the line the light is picked up, inasmuch as—irrespective of the precise pick-up point—virtually all of the light is ultimately applied to the photosensitive receiver. Therefore, the drawbacks of the prior art devices, described above, are eliminated.

A significant feature of the present invention is the provision of the light entry portion of the light-conductive element, which light entry portion extends in the direction of the length of the element so as to cause light entering the element to be substantially reflected toward the ends. The light will enter the element at substantially right angles to the surface. These light entry portions are, as described above, constituted by the groove and bead.

It will be appreciated that, in order to obtain the light-conductive effect, a component of the light entering the element will extend in the direction of the length of the element. This is readily obtained where the reflection is diffused, though in the case of mirroring reflection, particularly when the apparatus is to respond to light passing through the material, any problems which may arise at the surface of the element can be eliminated by the use of the fluorescent material, as described in conjunction with FIGURES 4 and 5. The fluorescent material, it will be appreciated, emits light in all directions so that the device will operate effectively even though the light striking the element itself will do so substantially exclusively in a plane at right angles to the length of the element. In that case, the total reflection feature becomes of less importance since not only primary but also secondary light will reach the receiver.

The reason for making only part of the light-conductive material of fluorescent material is to avoid undesired light absorption in cases where the work path is relatively wide.

It will be understood that the above description of the present invention is susceptible to various modifications, changes, and adaptations, and the same are intended to be comprehended within the meaning and range of equivalents of the appended claims.

What is claimed is:

1. An arrangement for scanning a material on a work path, said arrangement comprising, in combinaiton:
    (a) a light source for projecting light toward the material; and
    (b) means for picking up the light coming from the material, said pick-up means including an elongated element in the form of a generally cylindrical rod made of a light-conductive material and constituted in part of fluorescent material, said rod extending across the width of said work path and being provided with a longitudinal groove which is generally parallel with the line along which light coming from said work path strikes said element, there being arranged in said groove a further cylindrical rod, the latter being made of fluorescent material, and photosensitive receiver means located at at least one end of said element for producing a signal in response to the light which is picked up by said element and conducted toward said receiver means.

2. The arrangement defined in claim 1 wherein said light source constantly illuminates the material along the entire width of said work path.

3. The arrangement defined in claim 1 wherein said light source comprises lighting means for periodically sweeping a light spot over the material across the entire width of said work path.

4. The arrangement defined in claim 3 wherein said lighting means comprise an elongated light, a rotatably mounted drum coextensive with and surrounding said light, said drum being provided with a helical slot, and means for rotating said drum.

5. The arrangement defined in claim 3 wherein said lighting means comprise a light mounted for pivotal movement about an axis transverse to the width of said work path, and means for oscillating said light thereby to cause a light spot produced by said light to sweep across the entire width of said work path.

6. The arrangement defined in claim 3 wherein said lighting means comprise means for producing a collimated light beam, a polygonal mirror for reflecting said collimated light beam, and a parabolic mirror for reflecting the light reflected by said polygonal mirror, said means for producing the collimated light beam and said mirrors being arranged to sweep a light spot across the entire width of said work path.

7. The arrangement defined in claim 1 wherein said photosensitive receiver means include two receivers each located at a respective end of said light-conductive element.

8. The arrangement defined in claim 1 wherein said photosensitive receiver means comprise a receiver located at one end of said light-conductive element, and a mirror located at the other end of said light-conductive element for reflecting light toward said receiver.

9. The arrangement defined in claim 1 wherein said light source and said means for picking up the light coming from the material are located on the same side of said work path, in consequence of which said pick-up means pick up light reflected by the material on said work path.

10. The arrangement defined in claim 1 wherein said light source and said means for picking up the light coming from the material are located on opposite sides of said work path, in consequence of which said pick-up means pick up light passed through the material on said work path.

11. The arrangement defined in claim 1 wherein there are two means for picking up the light coming from the material, one of said two means being located on the same side of said work path as said light source so as to pick up light reflected by the material and the other of said two means being located on the opposite side of said work path so as to pick up light passed through the material.

12. The arrangement defined in claim 1 wherein said light-conductive element is provided with light entry means extending in the direction of the length of said element for causing light entering said element to be substantially totally reflected toward said end.

13. An arrangement for scanning a material on a work path, said arrangement comprising, in combination:
    (a) a light source for projecting light toward the material; and
    (b) means for picking up the light coming from the material, said pick-up means including an elongated element in the form of a rod made of light-conductive material and constituted in part of fluorescent material, said rod extending across the width of said work path and means made of fluorescent material arranged along a longitudinally extending region of said rod which is generally parallel with the line along which light coming from said work path strikes said rod, and photosensitive receiver means located at at least one end of said element for producing a signal in response to light which is picked up by said eleemnt and conducted toward said receiver means.

References Cited by the Examiner

UNITED STATES PATENTS

| | | | |
|---|---|---|---|
| 2,371,963 | 3/1945 | La Pierre | 250—219 |
| 2,879,398 | 3/1959 | Garrison | 250—71.5 |
| 2,919,624 | 1/1960 | Lindemann et al. | 250—219 |
| 2,945,958 | 7/1960 | Morris | 88—1 |
| 2,971,695 | 2/1961 | Sick | 250—224 X |
| 3,032,657 | 5/1962 | Meier et al. | 250—71.5 X |
| 3,060,319 | 10/1962 | Greunke | 250—227 X |
| 3,102,473 | 9/1963 | Gallagher | 250—219 |
| 3,198,951 | 8/1965 | Lentze | 250—219 |

RALPH G. NILSON, *Primary Examiner.*

M. A. LEAVITT, *Assistant Examiner.*